US010753464B2

(12) United States Patent
Roskowski et al.

(10) Patent No.: US 10,753,464 B2
(45) Date of Patent: Aug. 25, 2020

(54) SWITCH VALVE ASSEMBLY AND HYDRAULIC CONTROL MODULE INCLUDING SAME

(71) Applicant: BorgWarner Inc., Aurburn Hills, MI (US)

(72) Inventors: Steven J. Roskowski, Northville, MI (US); Howard Saxon, Clinton Township, MI (US); Christopher Vangorder, Ferndale, MI (US)

(73) Assignee: BorgWarner Inc., Auburn Hills, MI (US)

(*) Notice: Subject to any disclaimer, the term of this patent is extended or adjusted under 35 U.S.C. 154(b) by 24 days.

(21) Appl. No.: 15/626,210

(22) Filed: Jun. 19, 2017

(65) Prior Publication Data
US 2017/0363203 A1 Dec. 21, 2017

Related U.S. Application Data

(60) Provisional application No. 62/352,742, filed on Jun. 21, 2016.

(51) Int. Cl.
F16H 61/02 (2006.01)
F16K 15/06 (2006.01)
(Continued)

(52) U.S. Cl.
CPC ..... *F16H 61/0276* (2013.01); *F16H 61/0009* (2013.01); *F16K 11/04* (2013.01);
(Continued)

(58) Field of Classification Search
CPC .. F16K 31/1221; F16K 15/063; F16K 15/026; F16K 17/24; F16H 61/0009;
(Continued)

(56) References Cited

U.S. PATENT DOCUMENTS 867,702 A * 10/1907 Clarke ................. F16K 15/063
137/514.5
3,807,449 A * 4/1974 Van Dest ................. F15B 11/04
137/491

(Continued)

FOREIGN PATENT DOCUMENTS

CN 102829316 12/2012
CN 102829316 A 12/2012
(Continued)

OTHER PUBLICATIONS

English language abstract for CN 102829316 extracted from espacenet.com database on Oct. 23, 2019, 2 pages.
(Continued)

*Primary Examiner* — Reinaldo Sanchez-Medina
*Assistant Examiner* — Nicole Gardner
(74) *Attorney, Agent, or Firm* — Howard & Howard Attorneys PLLC

(57) ABSTRACT

A switch valve assembly controls first and second fluid flows in a hydraulic circuit defined by a valve body and a separator plate of a valve body assembly of a hydraulic control module. The valve body defines a fluid exit. The valve body is further defined as first and second body housings. The switch valve assembly includes a piston moveable between a first position for allowing the first fluid flow to flow and a second position for allowing the first and second fluid flows to flow into the fluid exit, and a biasing member coupled to the piston and biasing the piston from the second position toward the first position. The piston presents a regulating surface oriented with respect to the first axis. The first fluid flow fluidly engages the regulating surface in a manner that biases the piston into the first position in conjunction with the biasing member.

17 Claims, 18 Drawing Sheets

(51) Int. Cl.
*F16K 15/02* (2006.01)
*F16K 27/02* (2006.01)
*F16H 61/00* (2006.01)
*F16K 11/04* (2006.01)
*F16K 31/122* (2006.01)

(52) U.S. Cl.
CPC .......... *F16K 15/025* (2013.01); *F16K 15/063* (2013.01); *F16K 27/0263* (2013.01); *F16K 31/1221* (2013.01)

(58) Field of Classification Search
CPC ......... F16H 61/0276; Y10T 137/87587; Y10T 137/87611; Y10T 137/87627
See application file for complete search history.

(56) References Cited

U.S. PATENT DOCUMENTS

| | | | | |
|---|---|---|---|---|
| 4,350,179 | A | * | 9/1982 | Bunn .................. F04B 39/1053 137/246.12 |
| 4,936,166 | A | | 6/1990 | Holbrook et al. |
| 4,996,894 | A | | 3/1991 | Holbrook et al. |
| 5,829,560 | A | * | 11/1998 | Mainquist ........... F16H 61/0009 192/3.57 |
| 8,413,777 | B2 | | 4/2013 | Lundberg et al. |
| 9,108,508 | B2 | | 8/2015 | Vergara et al. |
| 9,593,805 | B2 | | 3/2017 | Zhao et al. |
| 2006/0196558 | A1 | * | 9/2006 | Feldman ............. F16K 27/0263 137/556 |
| 2013/0263948 | A1 | | 10/2013 | Block et al. |
| 2015/0204319 | A1 | * | 7/2015 | Columpsi ............. F16K 15/026 417/559 |

FOREIGN PATENT DOCUMENTS

| | | |
|---|---|---|
| CN | 103075486 | 5/2013 |
| CN | 103075486 A | 5/2013 |
| CN | 105202223 | 12/2015 |
| CN | 105202223 A | 12/2015 |
| DE | 20014697 | 12/2000 |
| DE | 20014697 U1 | 12/2000 |
| WO | 2004044466 A1 | 5/2004 |

OTHER PUBLICATIONS

English language abstract for CN 103075486 extracted from espacenet.com database on Oct. 23, 2019, 1 page.

English language abstract and machine-assisted English language translation for CN 105202223 extracted from espacenet.com database on Oct. 23, 2019, 4 pages.

Machine-assisted English language translation for DE 20014697 extracted from espacenet.com database on Oct. 23, 2019, 7 pages.

* cited by examiner

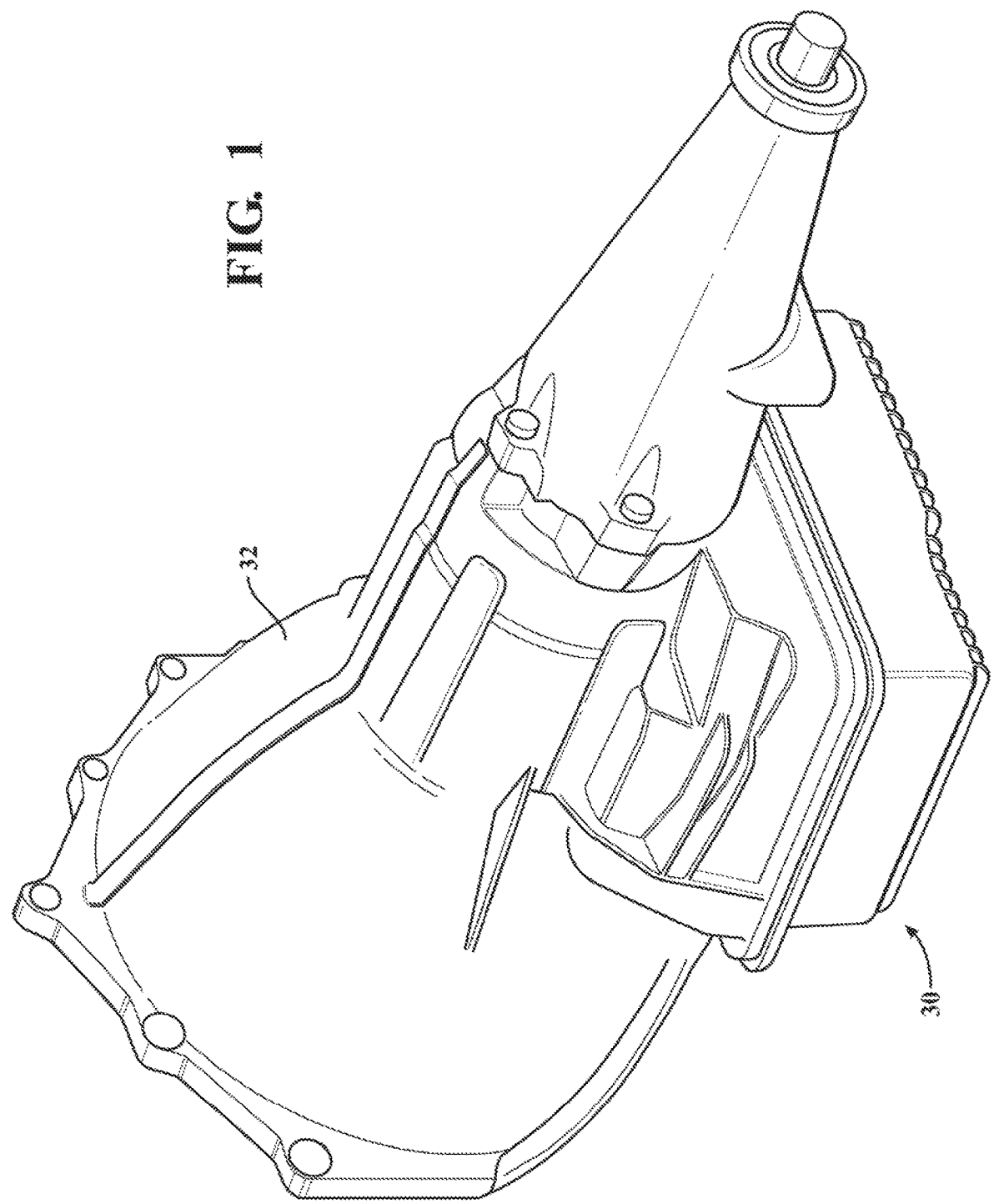

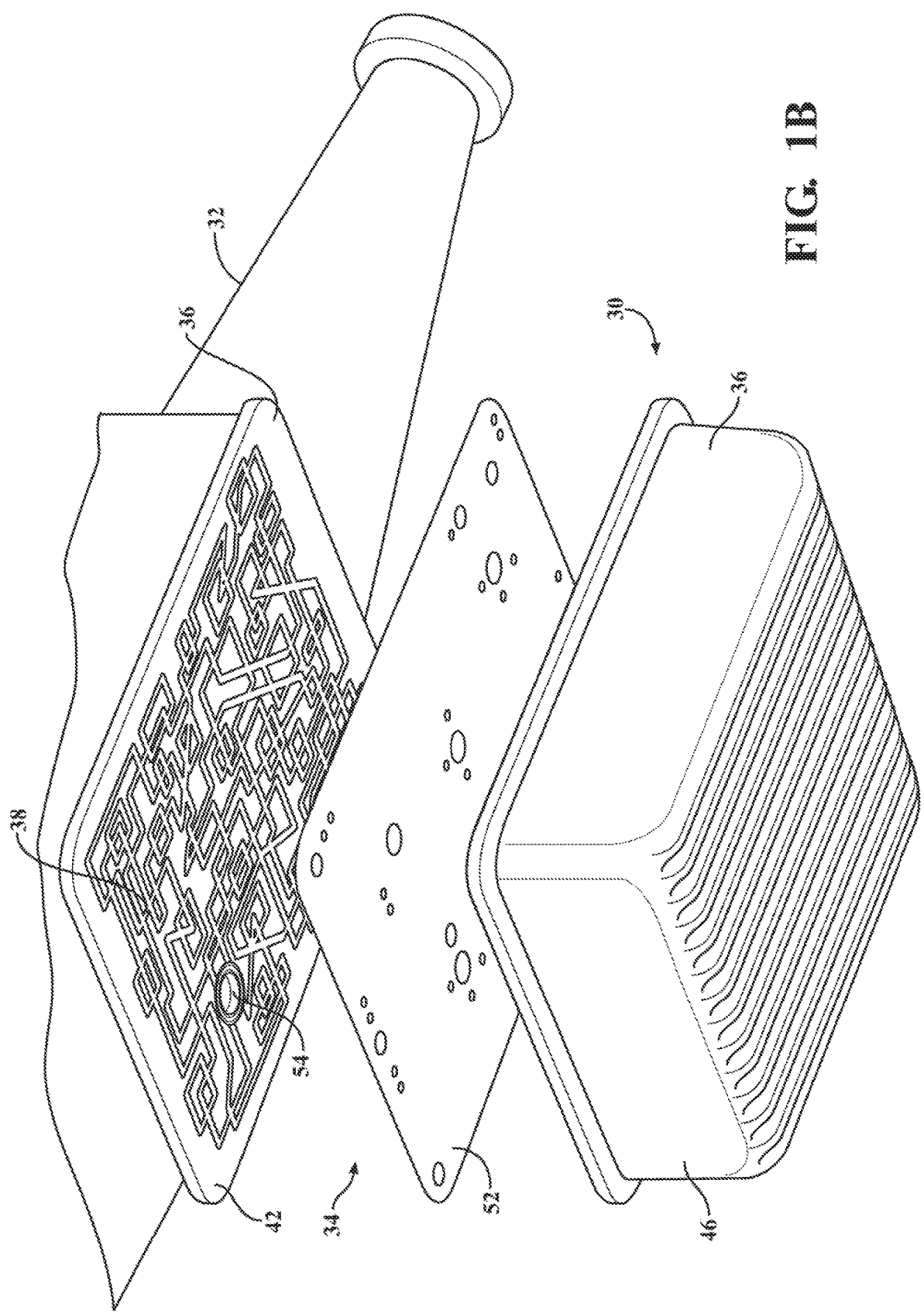

SWITCH VALVE ASSEMBLY AND HYDRAULIC CONTROL MODULE INCLUDING SAME

CROSS-REFERENCE TO RELATED APPLICATIONS

The subject patent application claims priority to and all the benefits of U.S. Provisional Patent Application No. 62/352,742 filed on Jun. 21, 2016, which is herein incorporated by reference in its entirety.

BACKGROUND OF THE INVENTION

1. Field of the Invention

The subject invention generally relates to a switch valve assembly and a hydraulic control module for controlling a first fluid flow and a second fluid flow.

2. Description of the Related Art

Conventional vehicle powertrain systems known in the art typically include an engine in rotational communication with a transmission. The engine generates rotational torque which is selectively translated to the transmission which, in turn, translates rotational torque to one or more wheels. Typical transmissions are shifted in discrete steps between a high-torque, low-speed mode for starting a vehicle and a high-speed, low-torque mode for vehicle operation at highway speeds. In a manual transmission, shifting is accomplished by the manual controlled engagement of gear sets. In an automatic transmission, shifting is accomplished by the automatic controlled engagement of friction elements.

To control shifting in the automatic transmission, a hydraulic control module includes valve body assembly and a switch valve assembly. The valve body assembly includes a valve body and a separator plate, with the valve body and separator plate defining a hydraulic circuit. The hydraulic circuit typically has a first fluid path for a first fluid flow provided by a first pump, and a second fluid path for a second fluid flow provided by a second pump. Fluid within the hydraulic circuit is controlled by various valves, such as the switch valve assembly, to provide fluid flow to various parts of the automatic transmission, which facilitates shifting and controlled engagement of the friction elements. Because various valves and various parts of the transmission require fluid flow at different times and intervals, the first fluid flow and the second fluid flow need to be regulated to selectively combine and restrict the first and second fluid flows.

Typically, the switch valve assembly includes a piston and a biasing member. The piston is moveable between a first position and a second position. Traditionally, the piston directs the first fluid flow and the second fluid flow through the hydraulic circuit and to various components of the automatic transmission. However, traditional pistons of switch valve assemblies do not restrict the first fluid flow from entering the second fluid path, which occurs when the first pump is active and the second pump is inactive. The first fluid flow flowing into the second fluid path causes inefficiencies with the second pump because the first fluid flow causes reverse driving of the second pump. Specifically, when reverse driving of the second pump occurs, the second pump requires additional power to activate the second pump to provide the second fluid flow. Furthermore, when reverse driving of the second pump occurs, the interval of time required to provide the second fluid flow may increase. Also, the first fluid flow flowing into the second fluid path increases leakage from the first fluid flow into the second fluid path, which decreases efficiency of the first pump providing the first fluid flow. Additionally, traditional switch valve assemblies are separate components and are not integrated into the hydraulic circuit defined by the valve body, which results in a need for a bigger valve body. As such, there remains a need to provide for an improved switch valve assembly.

SUMMARY OF THE INVENTION AND ADVANTAGES

A switch valve assembly controls a first fluid flow and second fluid flow in a hydraulic circuit. The hydraulic circuit is defined by a valve body and a separator plate of a valve body assembly of a hydraulic control module. The valve body defines a fluid exit within the hydraulic circuit. The valve body assembly is further defined as a first body housing defining a first fluid path in the hydraulic circuit for the first fluid flow and a second body housing defining a second fluid path in the hydraulic circuit for the second fluid flow. The separator plate is disposed between the first and second body housings for separating the first fluid path from the second fluid path. The first body housing defines a bore having a length with a first axis extending along the length of the bore. The switch valve assembly includes a piston disposed within the bore and moveable between a first position for allowing the first fluid flow to flow laterally within the first fluid path with respect to the first axis and into the fluid exit and for restricting the first fluid flow from entering into the second fluid path, and a second position for allowing the first and second fluid flows to flow into the fluid exit. The switch valve assembly also includes a biasing member coupled to the piston. The biasing member biases the piston from the second position toward the first position. The piston presents a regulating surface oriented with respect to the first axis such that the first fluid flow fluidly engages the regulating surface in a manner that biases the piston into the first position in conjunction with the biasing member.

Accordingly, the regulating surface of the piston is oriented with respect to the first axis such that the first fluid fluidly engages the regulating surface in a manner that biases the piston into the first position in conjunction with the biasing member restricts the first fluid flow from entering into the second fluid path. Restricting the first fluid flow from entering into the second fluid path prevents reverse driving of a second pump that provides the second fluid flow. Preventing reverse driving of the second pump helps decrease inefficiencies caused by the reverse driving of the second pump. Such inefficiencies include requiring additional power to activate the second pump to provide the second fluid flow, and an increase in the interval of time required to provide the second fluid flow. Also, restricting the first fluid flow from flowing into the second fluid path prevents leakage of the first fluid flow into the second fluid path, which increases efficiency of the first pump providing the first fluid flow. Additionally, the switch valve assembly is integrated into the hydraulic circuit defined by the valve body, which allows for a more compact valve body assembly.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a perspective view of a transmission and a hydraulic control module;

FIG. 1B is an exploded perspective view of the hydraulic control module including a switch valve assembly;

DETAILED DESCRIPTION OF THE INVENTION

Figure 1A:
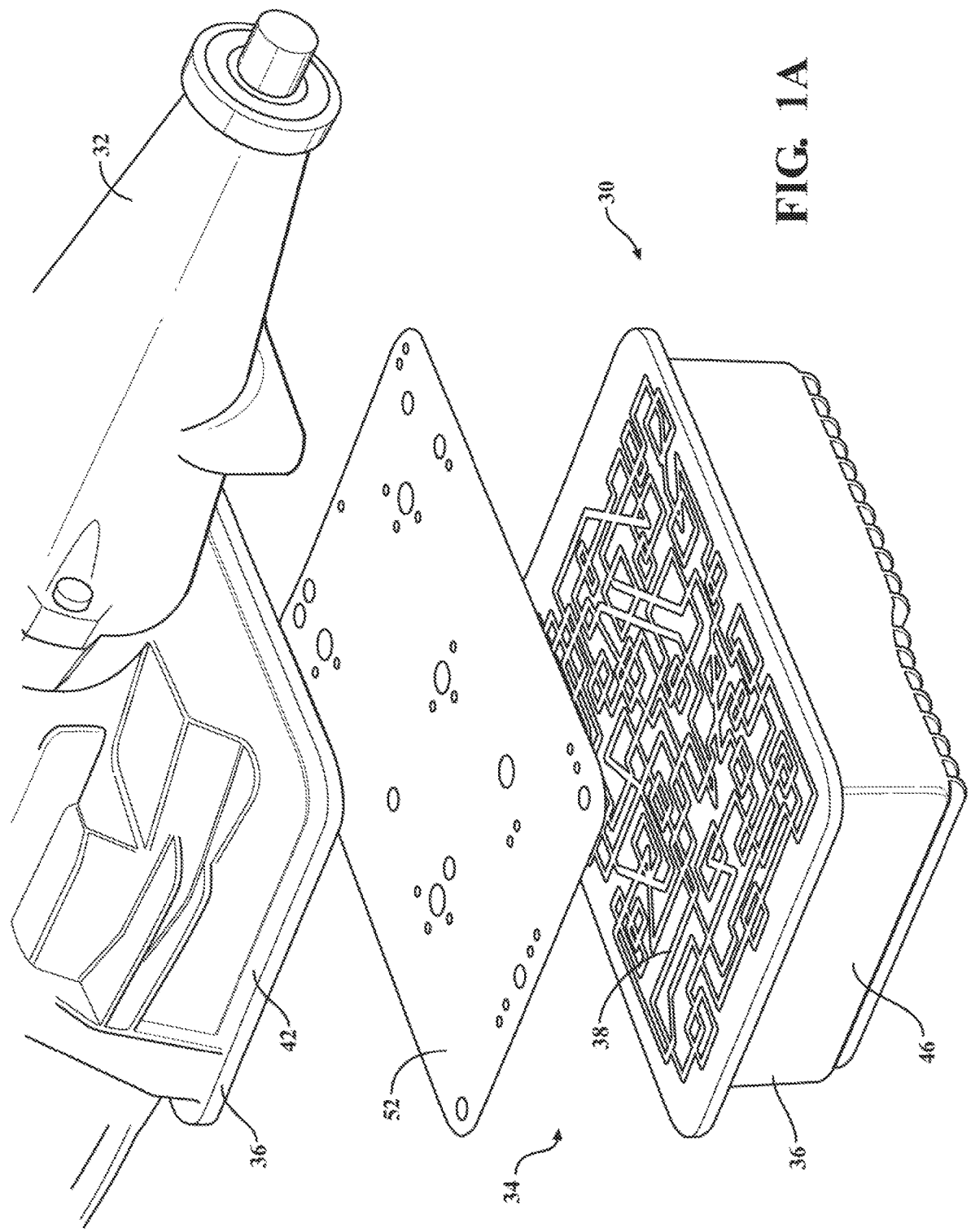
FIG. 1A is an exploded perspective view of the hydraulic control module including a valve body assembly, with the valve body assembly including a first body housing, a second body housing, and a separator plate disposed between the first and second body housings.
Figure 2:
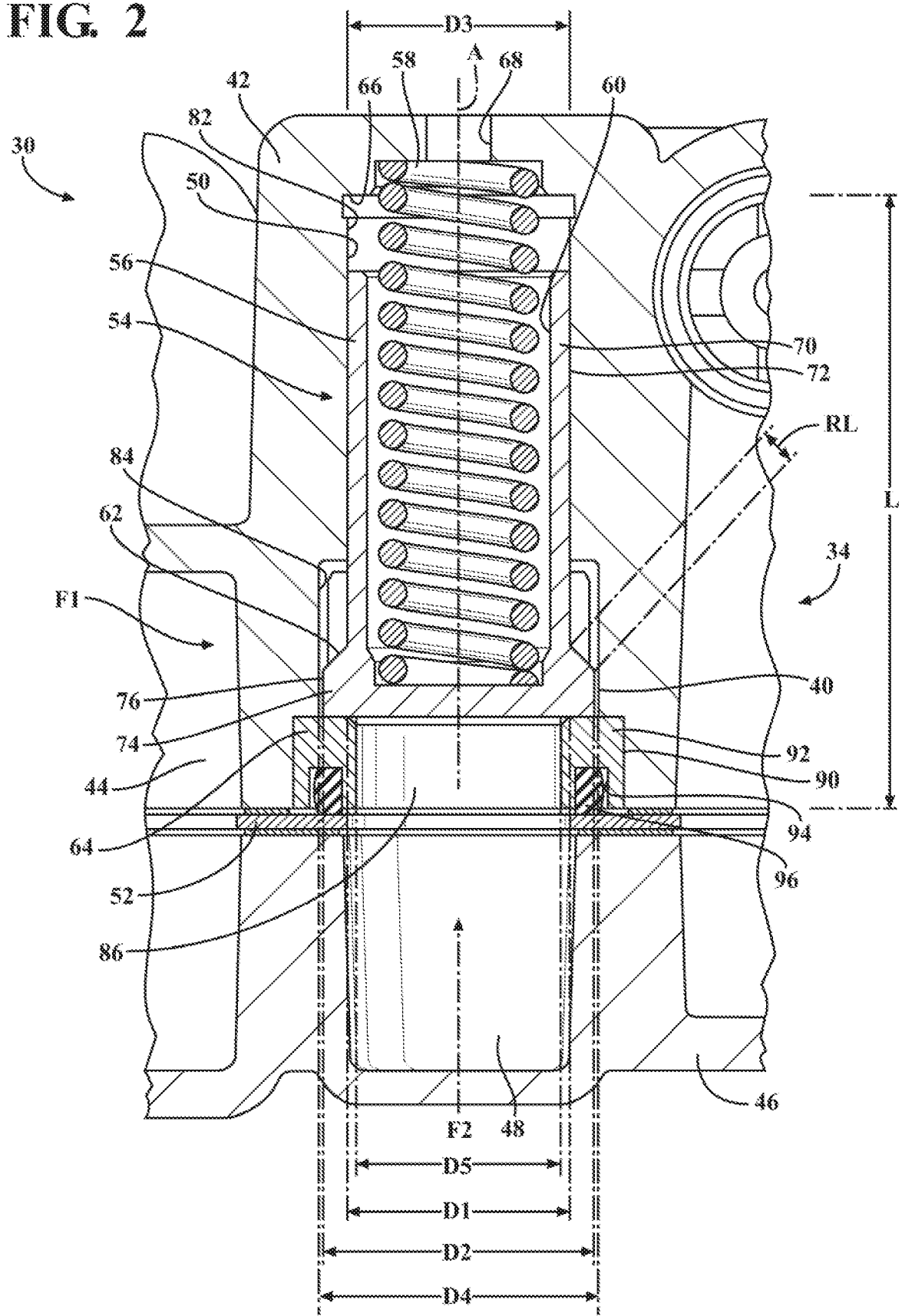
FIG. 2 is a cross-sectional view of the hydraulic control module, with the switch valve assembly including a piston moveable between a first position and a second position, a biasing member coupled to the piston, and a valve seat engageable by the piston when the piston is in the first position, with the piston presenting a regulating surface, and with the piston in the first position.

With reference to the Figures, wherein like numerals indicate like parts throughout the several views, a hydraulic control module 30 is generally shown in FIGS. 1, 1A, and 1B. The hydraulic control module 30 controls a first fluid flow F1 and a second fluid flow F2 in a transmission 32 of a vehicle. The hydraulic control module 30 includes a valve body assembly 34. The valve body assembly 34 includes a valve body 36 partially defining a hydraulic circuit 38, as best shown in FIGS. 1A and 1B. With reference to FIGS. 2-5, the valve body 36 defines a fluid exit 40 in the hydraulic circuit 38. In one embodiment, the transmission 32 is a dual clutch transmission (DCT). It is to be appreciated that the transmission 32 may be any other automatic transmission, such as a conventional automatic transmission. The transmission 32 may be used in any suitable vehicle, such as a car or truck.

The valve body assembly 34 and, specifically, the hydraulic circuit 38 directs fluid to various parts in the transmission 32, such as a torque converter, clutches, and servo bands. With reference to FIG. 1A-5, the valve body 36 is further defined as a first body housing 42 defining a first fluid path 44 for the first fluid flow F1 in the hydraulic circuit 38, and a second body housing 46 defining a second fluid path 48 for the second fluid flow F2 in the hydraulic circuit 38. The first fluid flow F1 flows within the first fluid path 44 and the second fluid flow F2 flows within the second fluid path 48.

The first body housing 42 defines a bore 50 having a length L with a first axis A extending along the length L of the bore 50. Typically, the first body housing 42 defining the bore 50 is made of a wear resistant material to prevent wear on the first body housing 42, as described in further detail below. The valve body assembly 34 includes a separator plate 52 further defining the hydraulic circuit 38. The separator plate 52 is disposed between the first and second body housings 42, 46 for separating the first fluid path 44 from the second fluid path 48.

Figure 3:
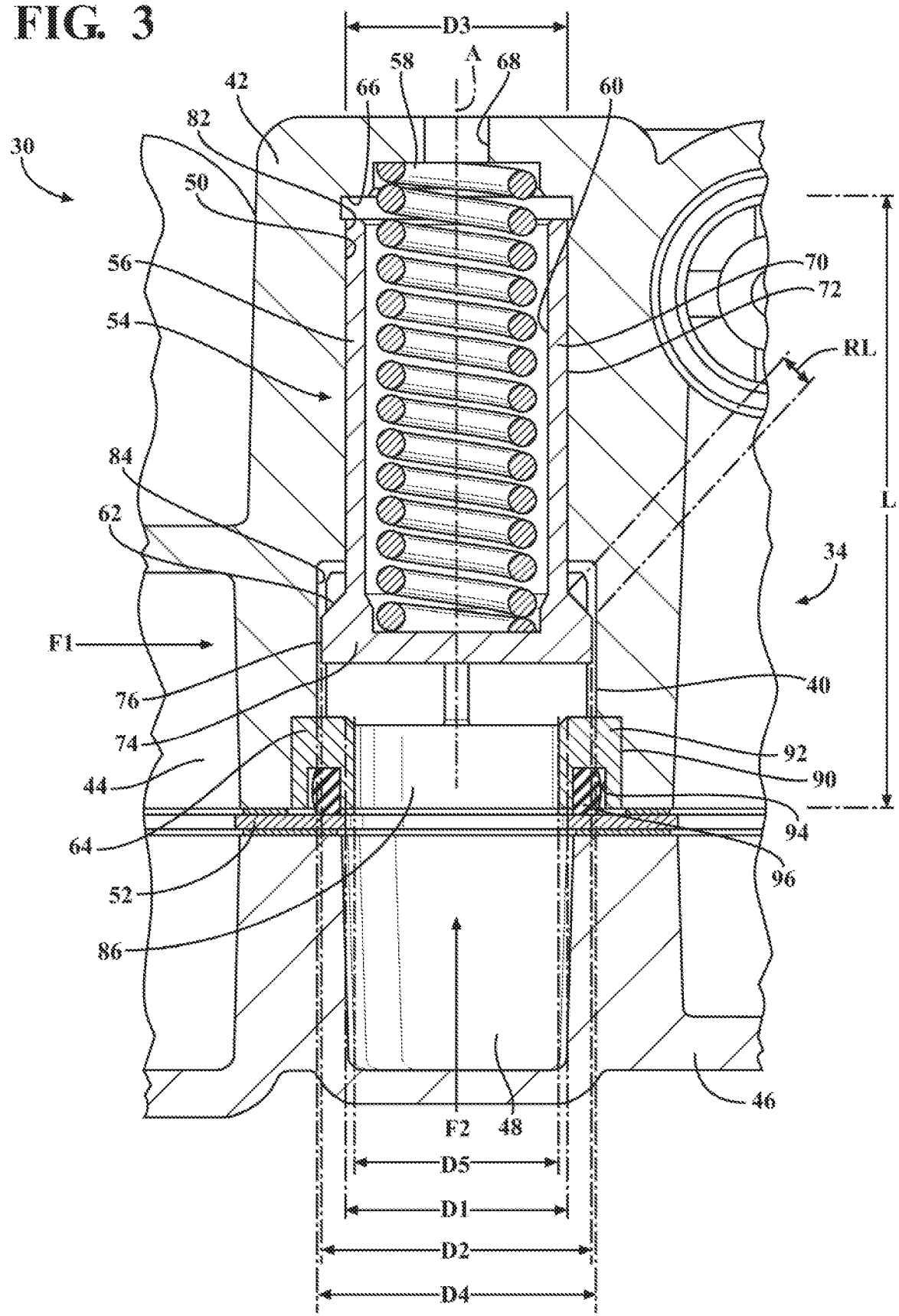
FIG. 3 is a cross-sectional view of the hydraulic control module, with the piston in an intermediate position.
Figure 4:
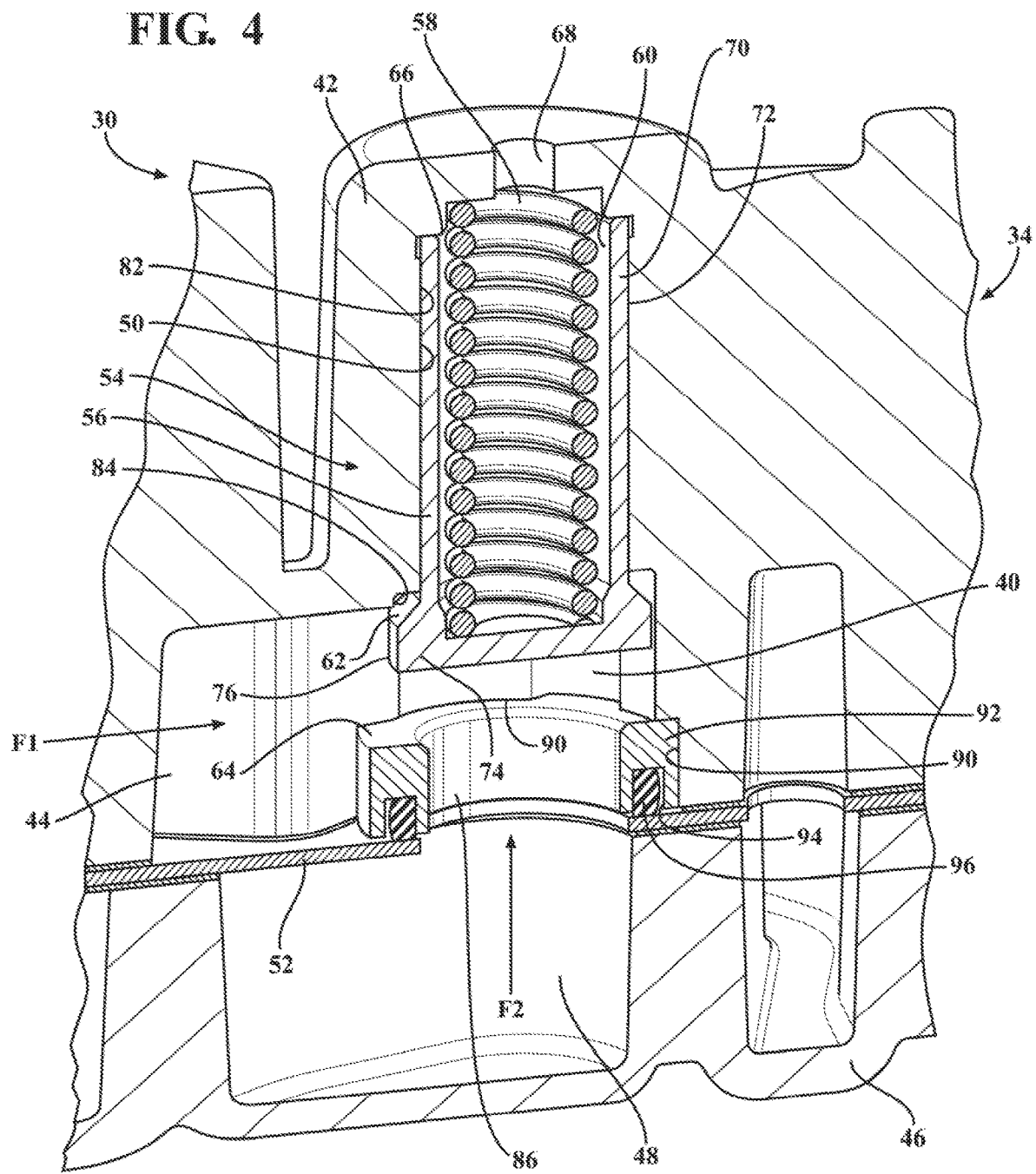
FIG. 4 is a cross-sectional perspective view of the hydraulic control module, with the piston in the second position.
Figure 5:
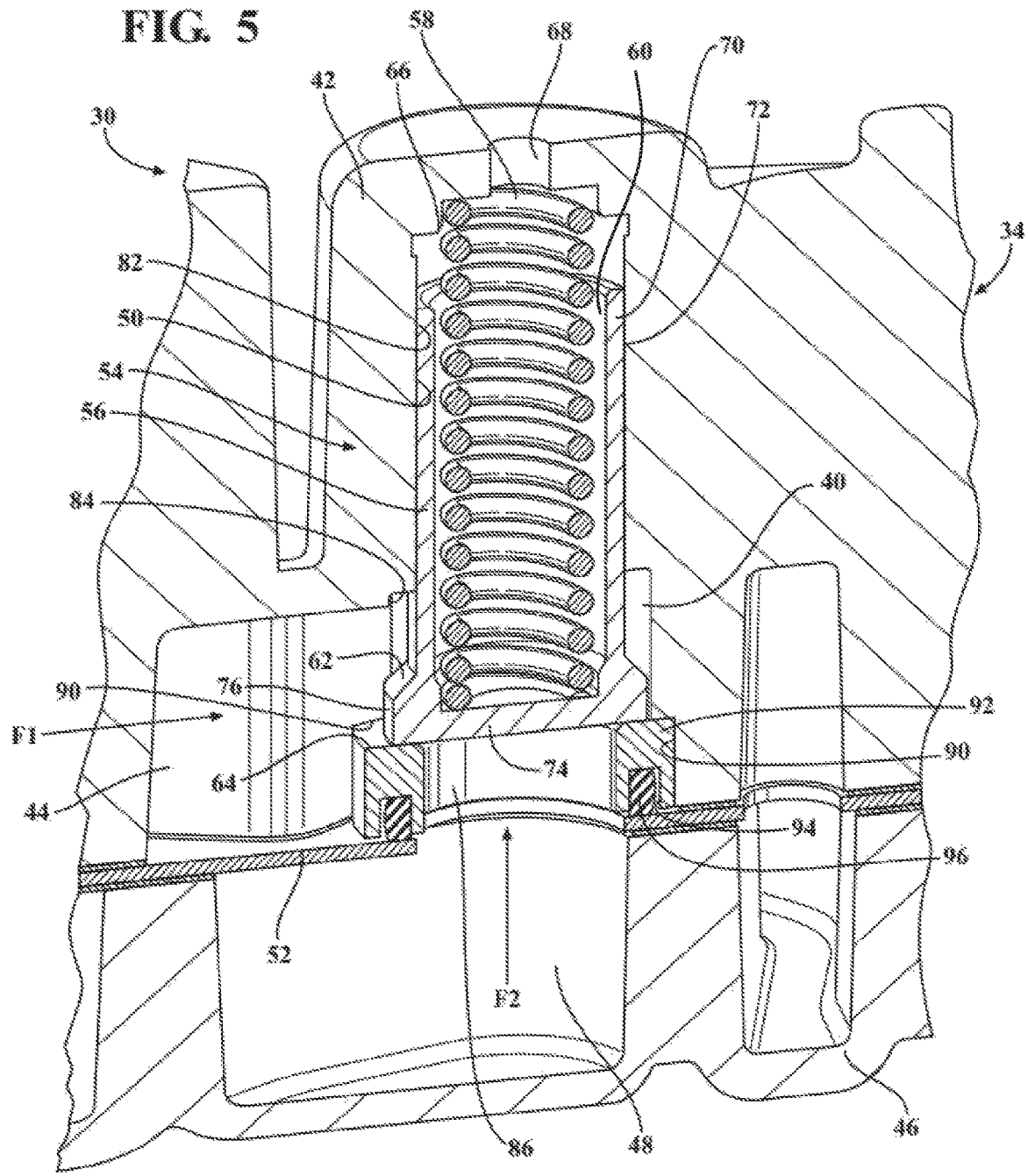
FIG. 5 is a cross-sectional perspective view of the hydraulic control module, with the piston in the first position.

The hydraulic control module 30 also includes a switch valve assembly 54 for controlling the first fluid flow F1 within the first fluid path 44 and the second fluid flow F2 within the second fluid path 48. Along with the separator plate 52, the switch valve assembly 54 may also separate the first fluid path 44 from the second fluid path 48. The switch valve assembly 54 includes a piston 56 disposed within the bore 50. The piston 56 is moveable between a first position, as shown in FIGS. 2 and 5-10, an intermediate position, as shown in FIG. 3, and a second position, as shown in FIG. 4. When the piston 56 is in the first position, the piston 56 allows the first fluid flow F1 to flow laterally within the first fluid path 44 with respect to the first axis A and into the fluid exit 40 and restricts the first fluid flow F1 from entering into the second fluid path 48, as described in further detail below. When the piston 56 is in the second position, the piston 56 allows the first and second fluid flows F1, F2 to flow into the fluid exit 40. As described above, the first body housing 42 is typically made of a wear resistant material to prevent wear on the first body housing 42 caused by movement of the piston 56 between the first and second positions. Similarly, the piston 56 is typically made of a wear resistant material, such as a hardened steel. One having ordinary skill in the art will appreciate that the piston 56 may be made of any other suitable material without departing from the nature of the present invention.

Figure 15:
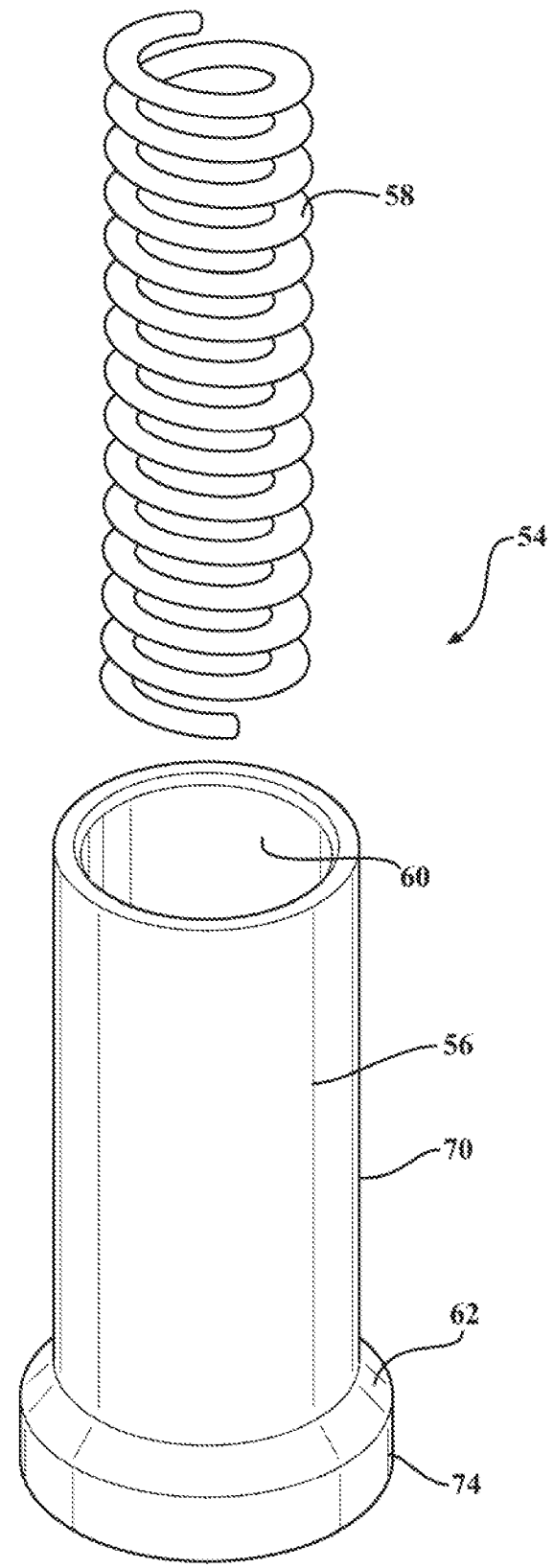
FIG. 15 is an exploded perspective view of the piston and the biasing member.
Figure 16:
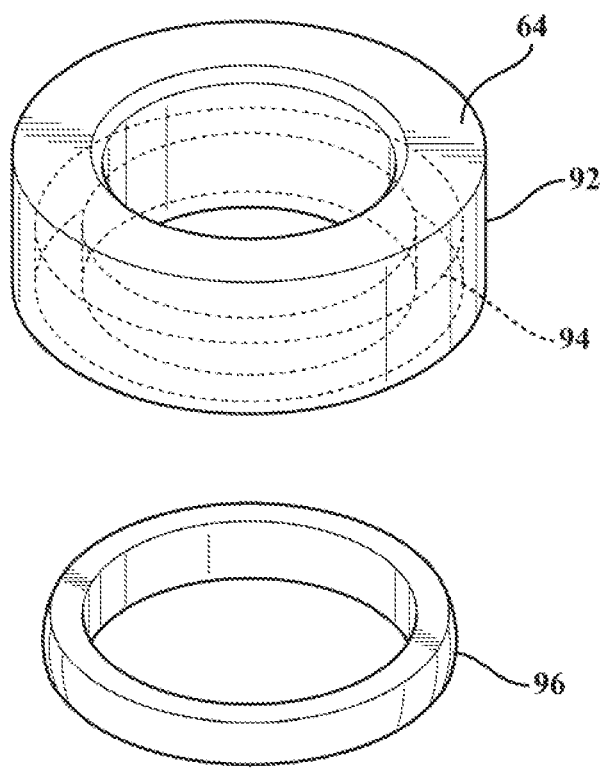
FIG. 16 is an exploded perspective view of the valve seat, with the valve seat including a seal ring defining a seal gland, and a seal.

The switch valve assembly 54 also includes a biasing member 58 coupled to the piston 56, as best shown in FIG. 15. The biasing member 58 biases the piston 56 from the second position toward the first position. The biasing member 58 may be coupled to the first body housing 42 and the piston 56. As shown in FIGS. 2-5, the biasing member 58 may be disposed between the piston 56 and the first body housing 42. In one embodiment, the piston 56 defines a piston bore 60 about the first axis A, with the biasing member 58 at least partially disposed within the piston bore 60. Typically, the biasing member 58 is a spring. It is to be appreciated that the biasing member 58 may be any other suitable biasing member not explicitly shown throughout the Figures, such as a magnetic biasing member. It is also to be appreciated that the hydraulic circuit 38 shown throughout the Figures is merely illustrative and that the switch valve assembly 54 may be used in other hydraulic circuits not explicitly shown throughout the Figures.

As shown in FIGS. 2-15, the piston 56 presents a regulating surface 62 oriented with respect to the first axis A. The first fluid flow F1 fluidly engages the regulating surface 62 in a manner that biases the piston 56 into the first position in conjunction with the biasing member 58. The orientation of the regulating surface 62 may be any configuration that biases the piston 56 into the first position in conjunction with the biasing member 58.

The switch valve assembly 54 allows for a compact design of the valve body assembly 34. The design of the switch valve assembly 54 allows the piston 56 and the biasing member 58 to be integrated into the valve body 36. Specifically, the design of the switch valve assembly 54 allows the piston 56 and the biasing member 58 to be integrated into the first body housing 42. It is to be appreciated that the piston 56 and the biasing member 58 of the switch valve assembly 54 may be integrated into the second body housing 46 without departing from the nature of the present invention. Having the switch valve assembly 54 integrated into the valve body 36 allows for a more compact design of the valve body assembly 34. Additionally, the design of the switch valve assembly 54 allows the switch valve assembly 54 to be integrated into any existing valve body assembly 34 and hydraulic circuit 38.

Typically, the switch valve assembly 54 is used when the hydraulic control module 30 includes two pumps (commonly referred to as a dual-pump control module in the art) for providing fluid flow throughout the hydraulic circuit 38. Typically, the valve body assembly 34 has a fluid reservoir (fluid source) for storing transmission fluid to be provided throughout the hydraulic circuit 38. Most commonly, a first pump and a second pump are fluidly coupled to the fluid reservoir for providing the first fluid flow F1 and the second fluid flow F2 in the hydraulic circuit 38. Specifically, the first and second fluid paths 44, 48 are fluidly coupled to the fluid reservoir for providing the first and second fluid flows F1, F2, respectively. In such embodiments, the first pump provides the first fluid flow F1 and the second pump provides the second fluid flow F2. Typically, the first pump provides the first fluid flow F1 at a first volumetric flow rate and the second pump provides the second fluid flow F2 at a second volumetric flow rate greater than the first volumetric flow rate.

The hydraulic control module 30 including two pumps may be used in a transmission 32 for a stop-start vehicle. In this embodiment, the second pump providing the second fluid flow F2 may be a mechanical pump powered by the engine of the vehicle. Therefore, when the engine is turned off, the mechanical pump is inactive and does not provide the second fluid flow F2. In this embodiment, the first pump provides the first fluid flow F1 to the fluid exit 40. The first pump is disconnected from the engine, i.e., does not require the engine to be turned on to provide the first fluid flow F1. The first pump is typically driven by an electric motor.

When the engine is turned off, the first pump provides the first fluid flow F1, which allows for a quicker start up for when the engine is turned on, as the fluid remains pressurized within the hydraulic circuit 38. When the engine is turned on, the second pump provides the second fluid flow F2, which then increases the fluid pressure within the hydraulic circuit 38. As mentioned above, the first pump provides the first fluid flow F1 at a first volumetric flow rate and the second pump provides the second fluid flow F2 at a second volumetric flow rate greater than the first volumetric flow rate. The second pump may be referred to as a primary pump and the first pump may be referred to as a secondary pump, as the second pump provides a higher volumetric flow rate to the fluid exit 40 and throughout the hydraulic circuit than the first pump. It is to be appreciated that the first and second pumps may be driven by an electric motor, a mechanically driven shaft, or a hydraulically driven impeller without departing from the nature of the present invention.

When the first pump provides the first fluid flow F1 and when the second pump is not providing the second fluid flow F2, the piston 56 is in the first position. As described above, when the piston 56 is in the first position, the first fluid flow F1 is restricted from entering the second fluid path 48. When the first fluid flow F1 is restricted from entering the second fluid path 48, the piston 56 restricts the fluid flow from reverse driving the second pump (primary pump) when the second pump is inactive, which reduces inefficiencies resulting from reverse driving of the second pump. Such inefficiencies include requiring additional power to activate the second pump to provide the second fluid flow F2, and an increase in the interval of time required to provide the second fluid flow F2. Also, when the piston 56 is in the first position, the first fluid flow F1 is restricted from entering the second fluid path 48, which prevents leakage of the first fluid flow F1 into the second fluid path 48 and increases efficiency of the first pump providing the first fluid flow F1. When the vehicle is a start-stop vehicle, the advantage of preventing reverse driving of the second pump provides is increased, as the second pump goes between an inactive and active state multiple times. When the biasing member 58 is a spring, the spring has a stiffness (k-factor) that allows the spring to bias the piston 56 into the first position when the second pump is inactive. Similarly, the spring has a stiffness that allows the piston 56 to move into the second position against the bias of the spring when the second pump is active. The stiffness of the spring may be adjusted depending on various factors, such as the first and second fluid flows F1, F2, the length of the bore 50, and the overall design of the valve body 36 and the hydraulic circuit 38. It is to be appreciated that the switch valve assembly 54 may be used in any transmission or hydraulic control module that functions with dual pumps.

In one embodiment, the switch valve assembly 54 may include a valve seat 64 engageable by the piston 56 when the piston 56 is in the first position. Various embodiments of the valve seat 64 are described in further detail below. When the piston 56 engages the valve seat 64 when in the first position, the piston 56 prevents the first fluid flow F1 from entering into the second fluid path 48. Specifically, when the first fluid flow F1 is provided from the fluid reservoir by the first pump and when the second fluid flow F2 is restricted from being provided from the fluid reservoir from the second pump when the second pump is inactive, the piston 56 allows the first fluid flow F1 to flow laterally within the first fluid path 44 with respect to the first axis A and into the fluid exit 40 and restricts the first fluid flow F1 from entering into the second fluid path 48. When the second pump is active and provides the second fluid flow F2, the piston 56 is in the second position and allows the second fluid flow F2, and optionally the first fluid flow F1, to flow into the fluid exit 40 by disengaging from the valve seat 64.

As described above, the switch valve assembly 54 allows for a compact design of the hydraulic control module 30. When the switch valve assembly 54 includes the valve seat 64, the design of the switch valve assembly 54 allows the piston 56, the biasing member 58, and the valve seat 64 to be integrated into the valve body 36. Specifically, the design of the switch valve assembly 54 allows the piston 56, the biasing member 58, and the valve seat 64 to be integrated into the first body housing 42. In some embodiments, the piston 56, the biasing member 58, and the valve seat 64 of the switch valve assembly 54 may be integrated into the second body housing 46. Having the switch valve assembly 54 integrated into the valve body 36 allows for a more compact design.

The switch valve assembly 54 may include a second valve seat 66 engageable by the piston 56 when the piston 56 is in the second position. When the piston 56 engages the second valve seat 66 when in the second position, the piston 56 allows the first and second fluid flows F1, F2 to flow into the fluid exit 40 and controls the amount of fluid flowing into the fluid exit 40. Said differently, when the second valve seat 66 is engaged by the piston 56 and secures the piston 56 in the second position, the piston 56 meters, i.e., controls and establishes a pressure shut off, the amount of fluid flow from both the first fluid flow F1 and the second fluid flow F2 entering into the fluid exit 40. Although the second valve seat 66 is shown throughout the Figures as being integral with the first body housing 42, it is to be appreciated that the second valve seat 66 may be a separate component without departing from the nature of the present invention.

The first body housing 42 may define a vent 68 adjacent the second valve seat 66. In one embodiment, the vent 68 is enclosed by the second valve seat 66. When the piston 56 is in the first position, the vent 68 is in fluid communication with the first fluid flow F1. When the second fluid flow F2 is provided by the second pump, which causes the piston 56 to move from the first position toward the second position, the vent 68 prevents hydraulic oscillation, and allows the piston 56 to move easily from the first position toward the second position and allows for a greater operating range. In other words, before the piston 56 is in the second position, the vent 68 assists in reducing the pressure imbalance caused by the second fluid flow F2 moving the piston 56 into the second position, and helps to keep the piston 56 engaged with the second valve seat 66. Once the piston 56 is in the second position, the vent 68 is blocked by the piston 56 such that the fluid may no longer flow through the vent 68.

In one embodiment, as best shown in FIGS. 2-6, the piston 56 has a first portion 70 having a first portion surface 72 having a first portion diameter D1, and a second portion 74 having a second portion surface 76 having a second portion diameter D2 greater than the first portion diameter D1. In this embodiment, the regulating surface 62 extends from the first portion surface 72 toward the second portion surface 76. Typically, the second portion 74 is disposed between the first portion 70 and the valve seat 64.

Figure 6:
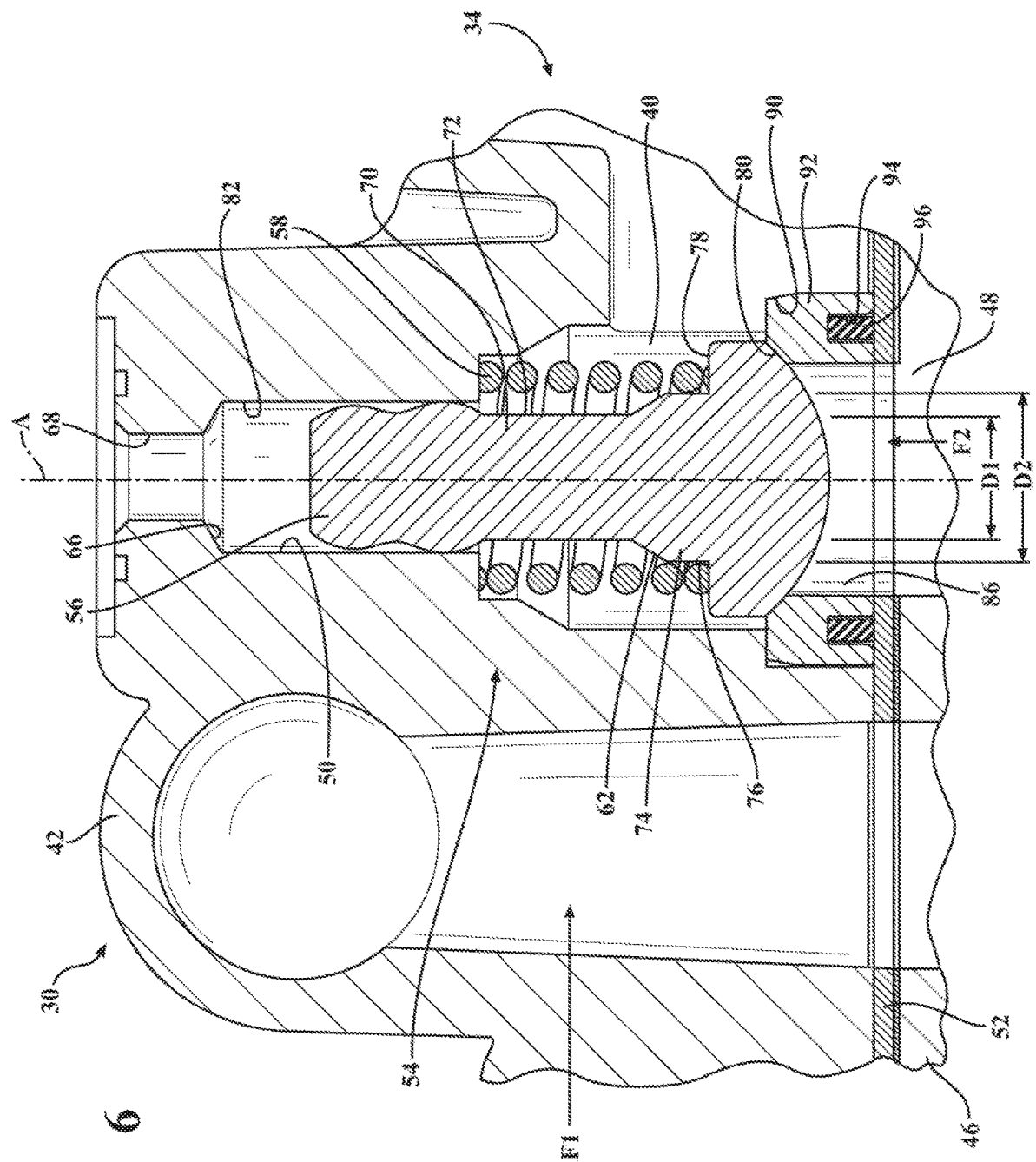
FIG. 6 is a cross-sectional perspective view of the hydraulic control module and another embodiment of the piston, with the piston in the first position.

Another embodiment of the piston 56 and the biasing member 58 is shown in FIG. 6. In this embodiment, the biasing member 58 is concentric about the piston 56. In this embodiment, the second valve seat 66 is integral with the first body housing 42. The piston 56 shown in FIG. 6 may present a piston seat 78, with the biasing member 58 disposed between the second valve seat 66 and the piston seat 78. The biasing member 58 biases the piston 56 from the second position toward the first position. In this embodiment, the valve seat 64 may present an engagement surface 80 configured to engage the piston 56. In other words, the engagement surface 80 is configured to be engaged by the piston 56 such that the first flow of fluid is restricted from flowing into the second fluid path.

The bore 50 defined by the first body housing 42 may be further defined as a first bore 82 having a first bore diameter D3, and a second bore 84 between the valve seat 64 and the first bore 82 having a second bore diameter D4 greater than the first bore diameter D3. The first portion 70 of the piston 56 is typically slideably disposed within the first bore 82 and the second portion 74 of the piston is typically slideably disposed within the second bore 84.

In one embodiment, the regulating surface 62 may be obliquely oriented with respect to the first axis A. The obliquely oriented regulating surface 62 is neither parallel nor at a right angle with respect to first axis A. As described above, the regulating surface 62 of the piston 56 is oriented with respect to the first axis A, which allows the first fluid flow F1 to fluidly engage the regulating surface 62 in a manner that biases the piston 56 into the first position in conjunction with the biasing member 58. Depending on the biasing force needed in conjunction with the biasing member 58 to prevent the first fluid flow F1 from entering into the second fluid path 48, the design of the regulating surface 62 may change.

For example, as shown in FIGS. 2-6, the regulating surface 62 may be angled with respect to the first axis A. When regulating surface 62 is angled, the regulating surface 62 may have a regulating length RL. When the biasing force needed in conjunction with the biasing member 58 to prevent the first fluid flow F1 from entering into the second fluid path 48 is higher, the regulating length RL may be greater to provide a greater surface area for the first fluid flow F1 to fluidly engage. Similarly, when the biasing force needed in conjunction with the biasing member 58 to prevent the first fluid flow F1 from entering into the second fluid path 48 is higher, the regulating length RL may be less to provide a smaller surface area for the first fluid flow F1 to fluidly engage.

Figure 7:
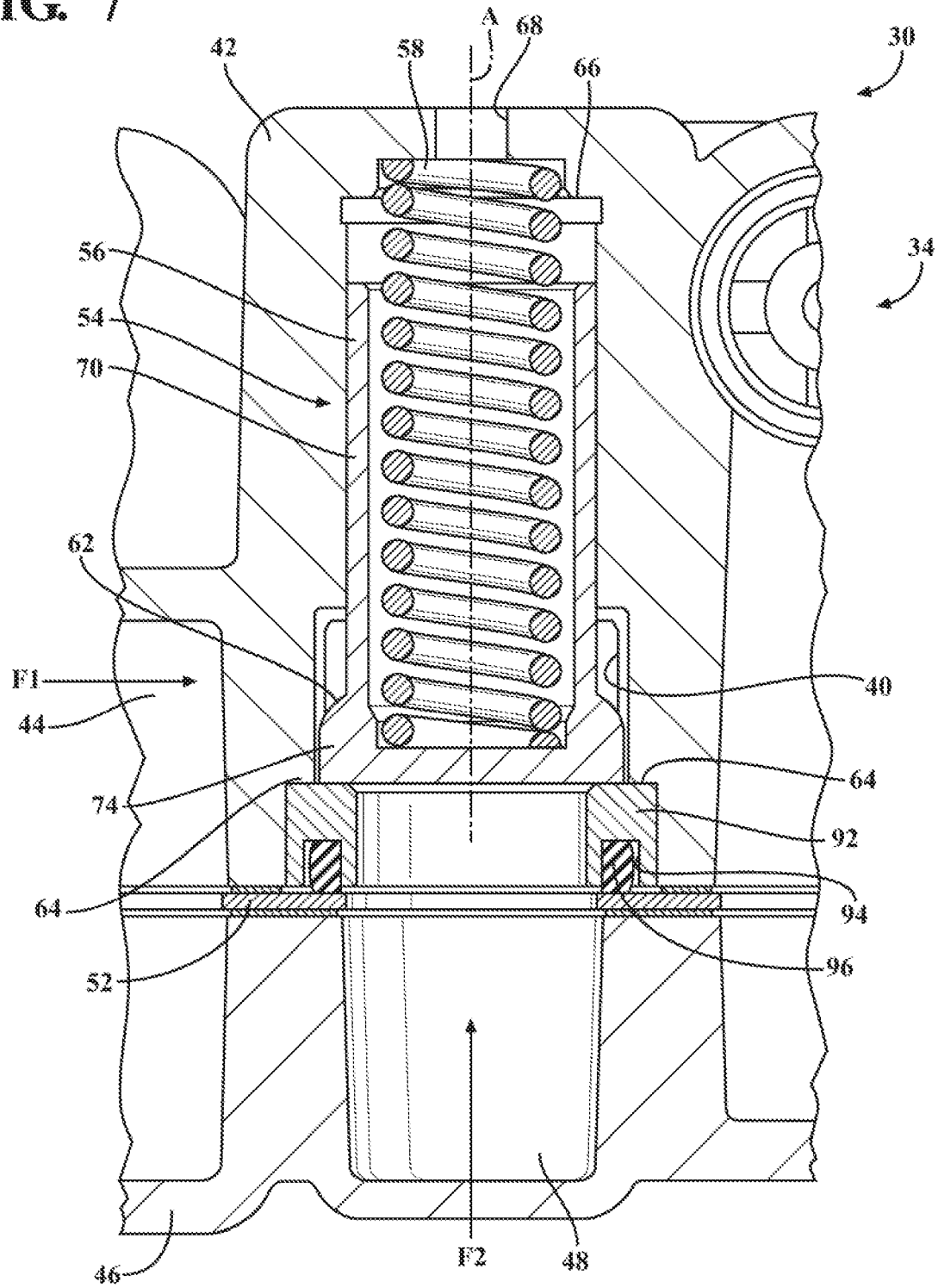
FIG. 7 is a cross-sectional view of the hydraulic control module and another embodiment of the regulating surface, with the piston in the first position.
Figure 8:
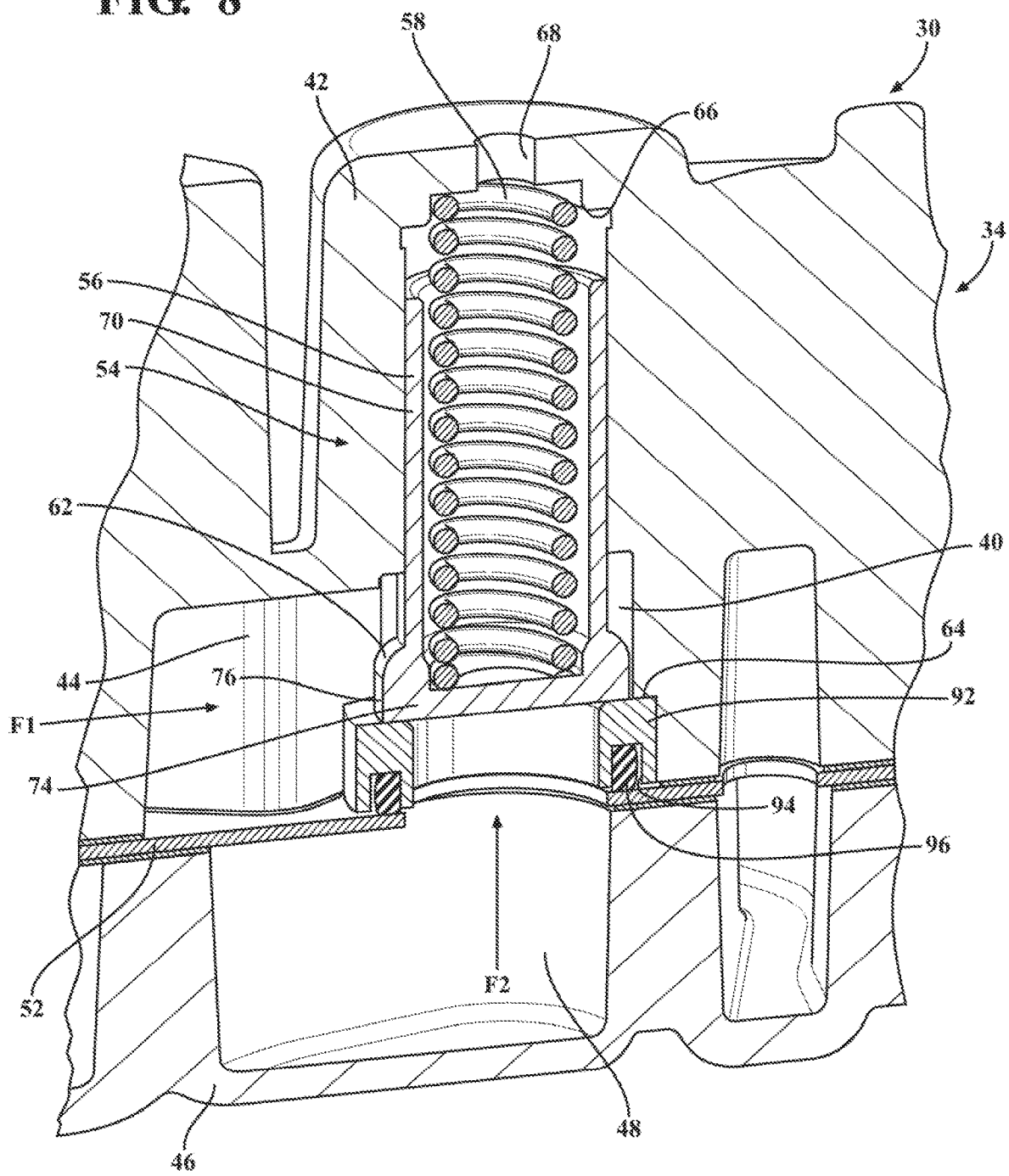
FIG. 8 is a cross-sectional perspective view of the hydraulic control module and the regulating surface of FIG. 7, with the piston in the first position.
Figure 9:
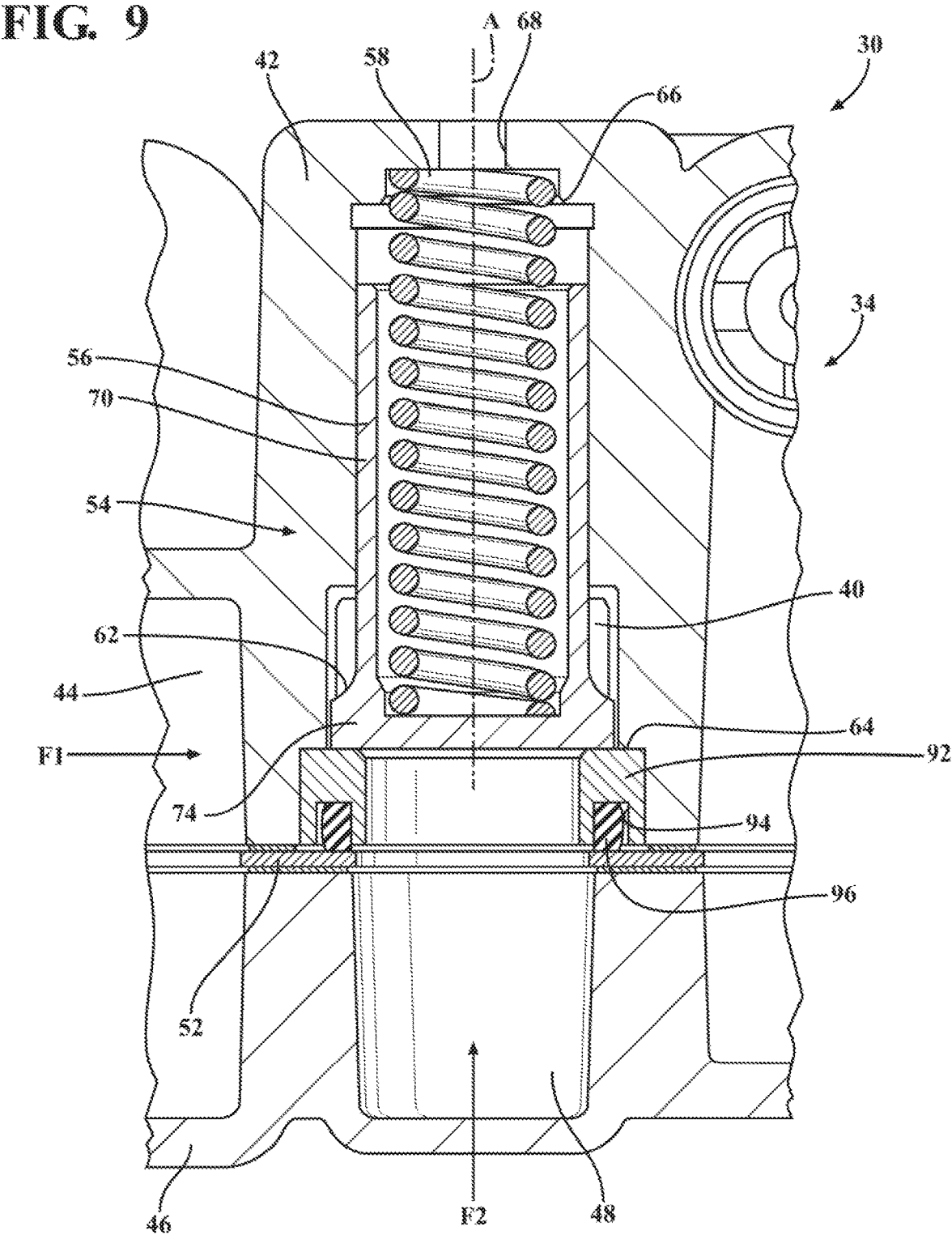
FIG. 9 is a cross-sectional view of the hydraulic control module and another embodiment of the regulating surface, with the piston in the first position.
Figure 10:
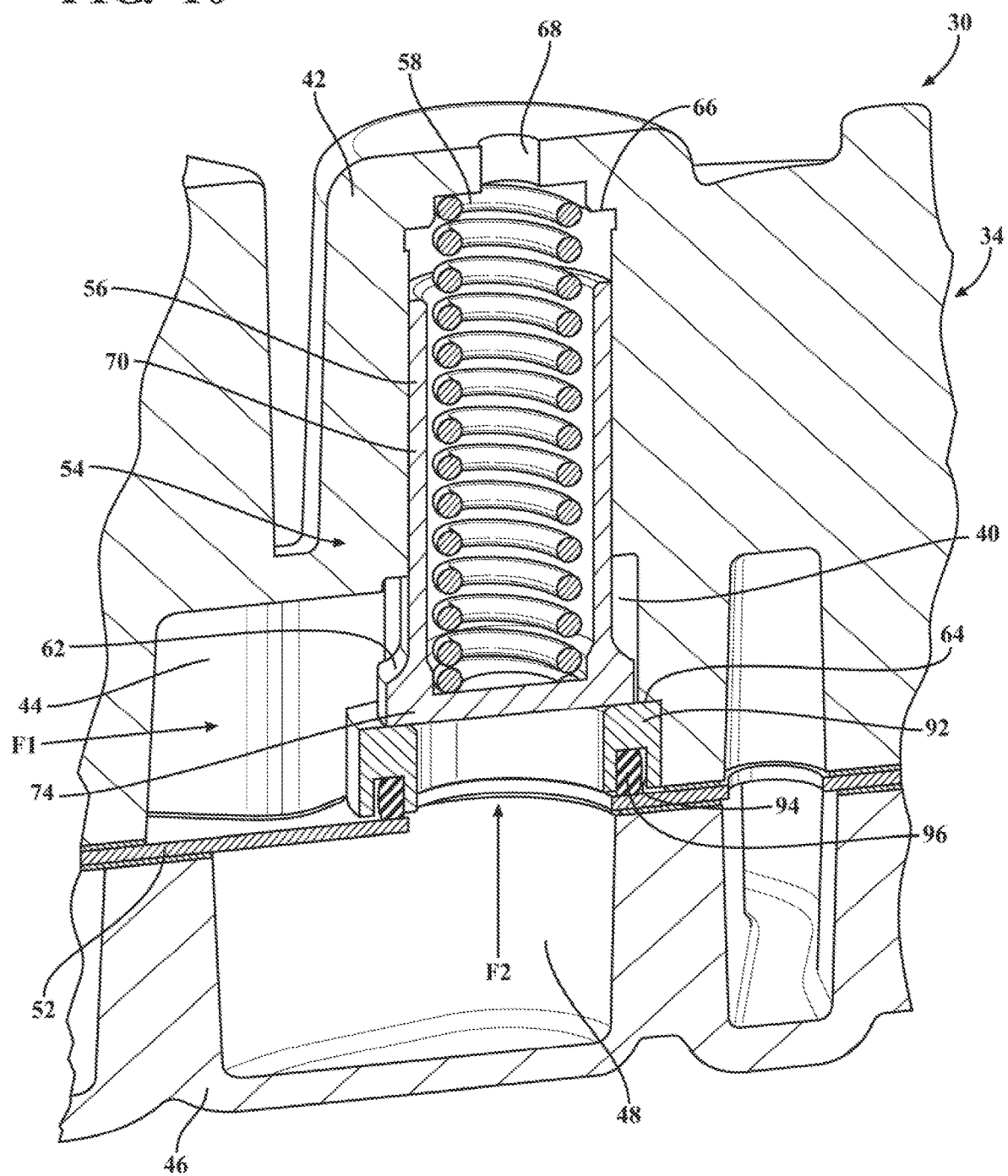
FIG. 10 is a cross-sectional perspective view of the hydraulic control module and the regulating surface of FIG. 9, with the piston in the first position.

As shown in FIGS. 7-10, the regulating surface 62 may be curved with respect to the first axis A. As described above with the angled regulating surface 62, the curved regulating surface 62 may be adjusted accordingly to provide a greater or less surface area for the first fluid flow F1 to fluidly engage, such that an appropriate biasing force of the first fluid flow F1 fluidly engaging the regulating surface 62 in conjunction with the biasing member 58 is provided. As shown in FIGS. 7 and 8, the regulating surface 62 may be convexly curved with respect to the first axis A. As shown in FIGS. 9 and 10, the regulating surface 62 may be concavely curved with respect to the first axis A.

As described above, the valve seat 64 is engageable by the piston 56 when the piston 56 is in the first position. In one embodiment, the valve seat 64 may define a valve seat hole 86 having an inner valve diameter D5 less than the second bore diameter D4 and less than the second portion diameter D2 such that the piston 56 engages the valve seat 64 when in the first position.

The first body housing may define a cutout 90. In this embodiment, the valve seat 64 may be disposed within the cutout 90 for fixing the valve seat 64 with respect to the first body housing 42 and the separator plate 52. The valve seat 64 may be disposed between the first body housing 42 and the separator plate 52 for fixing the valve seat 64 between the first body housing 42 and the separator plate 52. The first body housing 42 may define three cutouts 90 with the valve seat 64 disposed within each of the cutouts 90 for fixing the valve seat 64 between the first body housing 42 and the separator plate 52. In this embodiment, the valve seat 64 may be integrated into various designs of the first body housing 42. Said differently, the design of the valve seat 64 allows the valve seat 64 to be integrated into any valve body 36, which allows flexibility in manufacturing of the switch valve assembly 54 with the valve body 36, a more compact design of the first body housing 42, and for the switch valve assembly 54 with the valve seat 64 to be integrated into the valve body 36. It is to be appreciated that the first body housing 42 may define any number of cutouts 90 for fixing the valve seat 64 between the first body housing 42 and the separator plate 52 without departing from the nature of the present invention.

Figure 11:
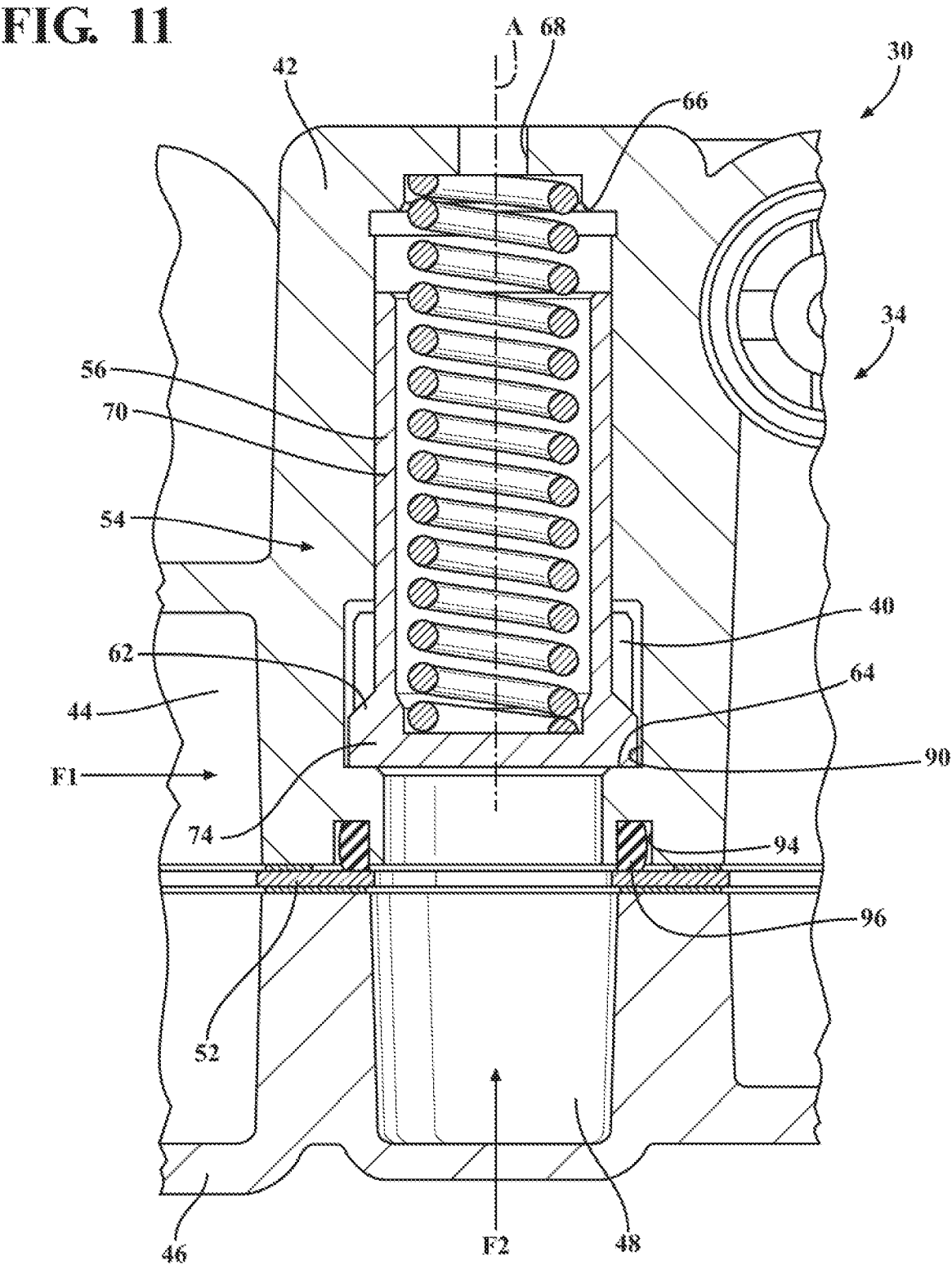
FIG. 11 is a cross-sectional view of the hydraulic control module, with the valve seat integral with the first body housing.
Figure 12:
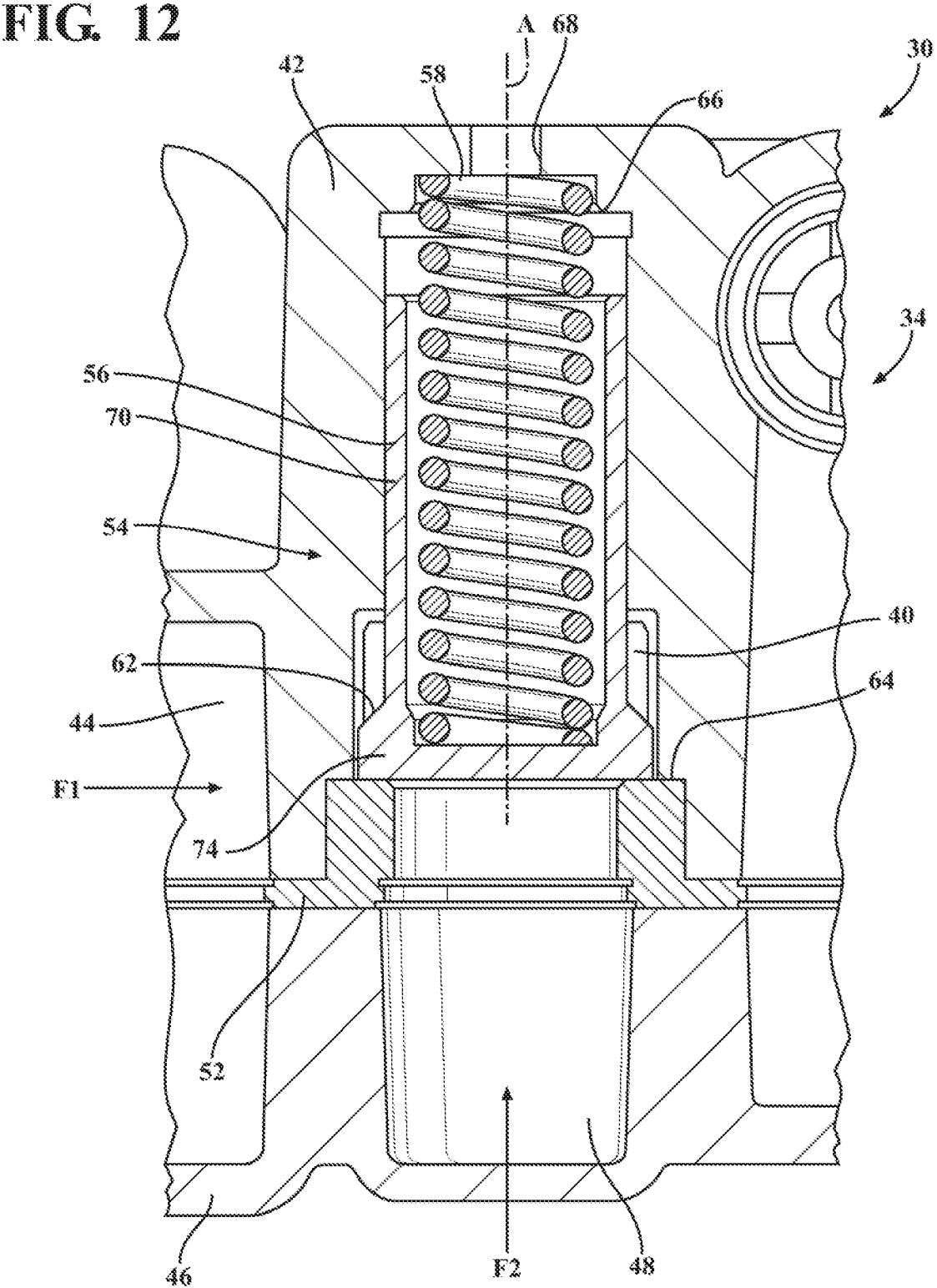
FIG. 12 is a cross-sectional view of the hydraulic control module, with the valve seat integral with the separator plate.
Figure 13:
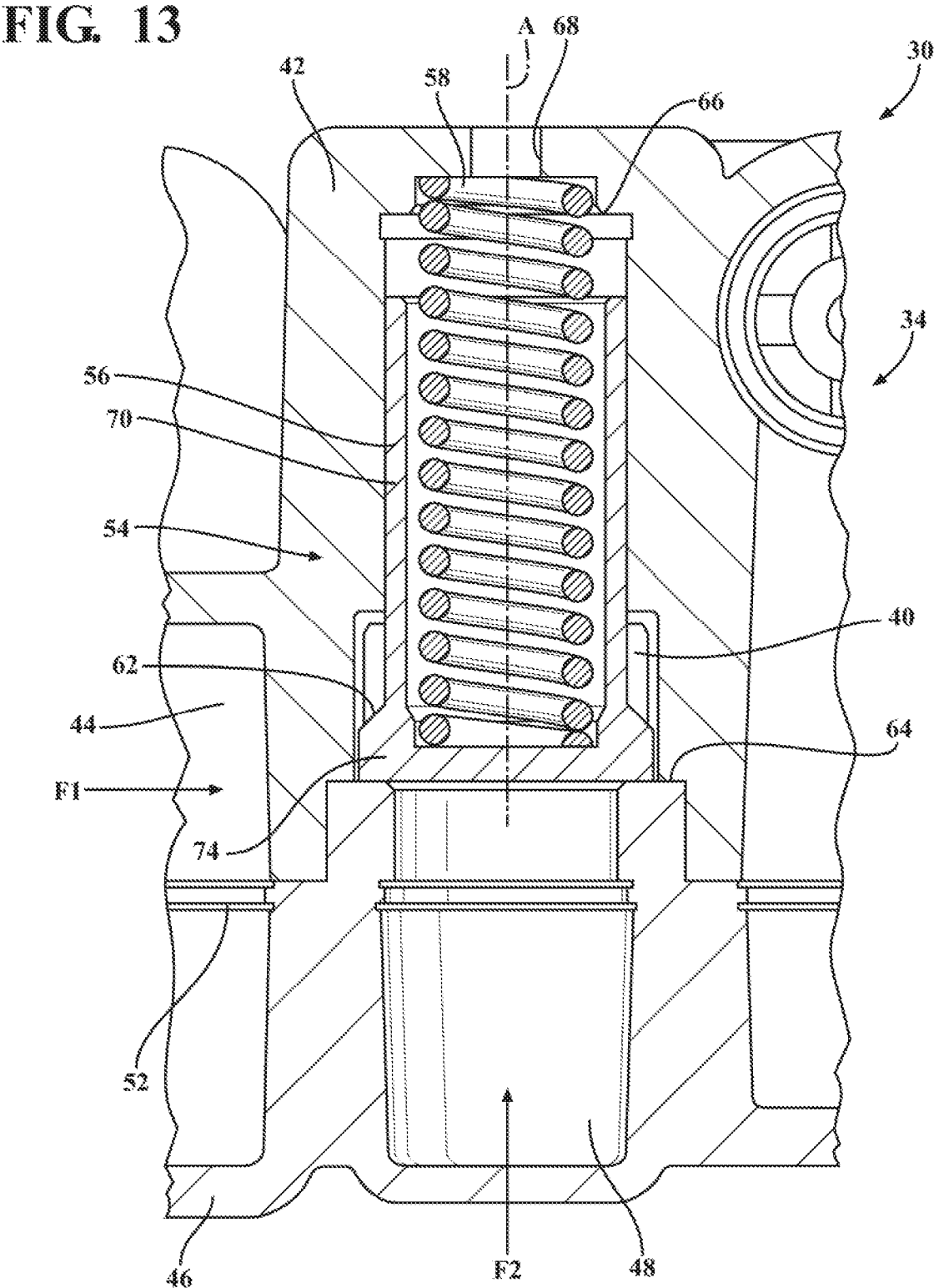
FIG. 13 is a cross-sectional view of the hydraulic control module, with the valve seat integral with the second body housing.
Figure 14:
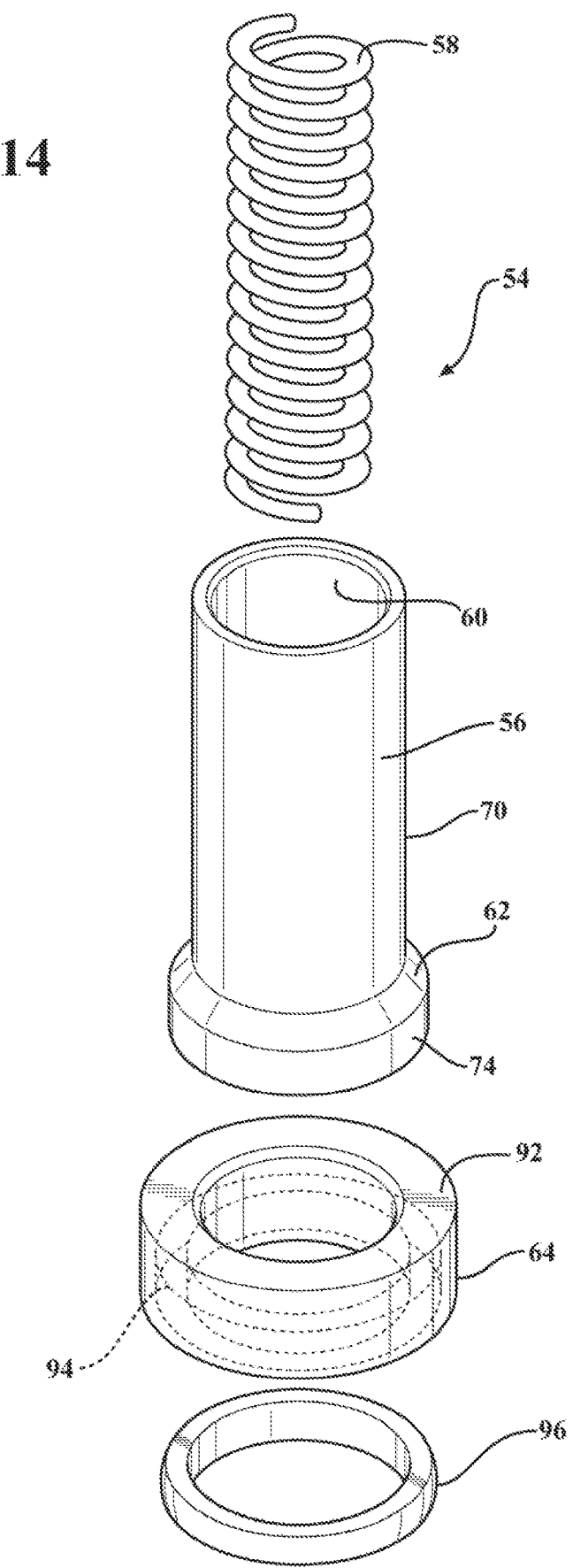
FIG. 14 is an exploded perspective view of the switch valve assembly.

In one embodiment, as shown in FIG. 11, the valve seat 64 is integral with the first body housing 42. In another embodiment, as shown in FIG. 12, valve seat 64 is integral with the separator plate 52. In yet another embodiment, as shown in FIG. 13, the valve seat 64 is integral with the second body housing 46.

The valve seat 64 may include a seal ring 92 defining a seal gland 94, and a seal 96 disposed within the seal gland 94. In this embodiment, the seal 96 engages the seal ring 92 for restricting the first fluid flow F1 from flowing into the second fluid path 48. Typically, the seal 96 engages the seal ring 92 and the separator plate 52 to fix the seal 96 within the seal gland 94 for restricting the first fluid F1 flow from flowing between the separator plate 52 and the seal ring 92 into the second fluid path 48. As described above, when the second fluid flow F2 is turned off, i.e. the second pump being inactive and when the engine is turned off, the piston 56 engages the valve seat 64 to prevent the first fluid flow F1 from entering into the second fluid flow F2. In such embodiments, the seal 96 also prevents leakage of the first fluid flow F1 from entering the second fluid path 48 when the second pump is turned off.

It is to be appreciated that various components of the hydraulic control module 30, the valve body assembly 34, and the switch valve assembly 54 are merely illustrative and may not be drawn to scale.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A hydraulic control module for controlling a first fluid flow and a second fluid flow, said hydraulic control module comprising:
    a valve body assembly comprising,
        a valve body partially defining a hydraulic circuit and a fluid exit in said hydraulic circuit, with said valve body further defined as a first body housing defining a first fluid path in said hydraulic circuit for the first fluid flow and a second body housing defining a second fluid path in said hydraulic circuit for the second fluid flow, and with said first body housing defining a bore having a length with a first axis extending along said length of said bore, and
        a separator plate disposed between said first and second body housings for separating said first fluid path from said second fluid path, with said separator plate further defining said hydraulic circuit; and
    a switch valve assembly for controlling the first fluid flow within said first fluid path and the second fluid flow within said second fluid path, said switch valve assembly comprising;
        a piston disposed within said bore and moveable between a first position and a second position,
        a biasing member coupled to said piston, with said biasing member biasing said piston from said second position toward said first position, and
        a valve seat engageable by said piston when said piston is in said first position;
    wherein
    said piston presents a regulating surface oriented with respect to said first axis such that the first fluid flow fluidly engages said regulating surface in a manner that biases said piston into said first position in conjunction with said biasing member;
    wherein said piston has a first portion having a first portion surface having a first portion diameter, and a second piston portion disposed between said first portion and said valve seat and having a second portion surface having a second portion diameter greater than said first portion diameter, with said regulating surface extending from said first portion surface toward said second portion surface; and
    wherein said bore defined by said first body housing is further defined as a first bore having a first bore diameter, and a second bore between said valve seat and said first bore having a second bore diameter greater than said first bore diameter, with said first portion of said piston slideably disposed within said first bore and said second portion of said piston slideably disposed within said second bore.

2. The hydraulic control module as set forth in claim 1, wherein said regulating surface is obliquely oriented with respect to said first axis.

3. The hydraulic control module as set forth in claim 1, wherein said regulating surface is angled with respect to said first axis.

4. The hydraulic control module as set forth in claim 1, wherein said valve seat defines a valve seat hole having an inner valve diameter less than said second bore diameter and less than said second portion diameter such that said piston engages said valve seat when in said first position.

5. The hydraulic control module as set forth claim 1, wherein said first body housing defines a cutout, with said valve seat disposed within said cutout for fixing said valve seat between said first body housing and said separator plate.

6. A switch valve assembly for controlling a first fluid flow and second fluid flow in a hydraulic circuit defined by a valve body and a separator plate of a valve body assembly of a transmission of a vehicle, with the valve body defining a fluid exit within the hydraulic circuit, with the valve body further defined as a first body housing defining a first fluid path in the hydraulic circuit for the first fluid flow and a second body housing defining a second fluid path in the hydraulic circuit for the second fluid flow, with the separator plate disposed between the first and second body housings for separating the first fluid path from the second fluid path, and with the first body housing defining a bore having a length with a first axis extending along the length of the bore, said switch valve assembly comprising:
    a piston disposed within the bore and moveable between a first position for allowing the first fluid flow to flow laterally within the first fluid path with respect to the first axis and into the fluid exit and for restricting the first fluid flow from entering into the second fluid path, and a second position for allowing the first and second fluid flows to flow into the fluid exit; and
    a biasing member coupled to said piston, with said biasing member biasing said piston from said second position into said first position; wherein said piston presents a regulating surface oriented with respect to the first axis such that the first fluid flow fluidly engages said regulating surface in a manner that biases said piston from said second position into said first position in conjunction with said biasing member; and wherein said piston defines a piston bore about the first axis, with said biasing member at least partially disposed within said piston bore.

7. The switch valve assembly as set forth in claim 6, further comprising a valve seat engageable by said piston when said piston is in said first position.

8. The switch valve assembly as set forth in claim 7, wherein said valve seat comprises a seal ring defining a seal gland, and a seal disposed within said seal gland, with said seal engaged with said seal ring for restricting the first fluid flow from flowing into the second fluid path.

9. The switch valve assembly as set forth in claim 6, wherein said piston has a first portion having a first portion surface having a first portion diameter and a second portion having a second portion surface having a second portion diameter greater than said first portion diameter, with said regulating surface extending from said first portion surface toward said second portion surface.

10. The switch valve assembly as set forth in claim 6, wherein said regulating surface is obliquely oriented with respect to the first axis.

11. The switch valve assembly as set forth in claim 6, wherein said regulating surface of said piston is angled with respect to the first axis.

12. The switch valve assembly as set forth in claim 6, wherein said regulating surface of said piston is curved with respect to the first axis.

13. The switch valve assembly as set forth in claim 12, wherein said regulating surface of said piston is convexly curved with respect to the first axis.

14. The switch valve assembly as set forth in claim 12, wherein said regulating surface of said piston is concavely curved with respect to the first axis.

15. A switch valve assembly for controlling a first fluid flow and second fluid flow in a hydraulic circuit defined by a valve body and a separator plate of a valve body assembly of a transmission of a vehicle, with the valve body defining a fluid exit within the hydraulic circuit, with the valve body assembly further defined as a first body housing defining a first fluid path in the hydraulic circuit for the first fluid flow and a second body housing defining a second fluid path in the hydraulic circuit for the second fluid flow, with the separator plate disposed between the first and second body housings for separating the first fluid path from the second fluid path, with the first body housing defining a bore having a length with a first axis extending along the length of the bore, and with the first body housing defining a cutout, said switch valve assembly comprising:

a piston disposed within the bore and moveable between a first position for allowing the first fluid flow to flow laterally within the first fluid path with respect to the first axis and into the fluid exit and for restricting the first fluid flow from entering into the second fluid path, and a second position for allowing the first and second fluid flows to flow into the fluid exit;

a biasing member coupled to said piston, with said biasing member biasing said piston from said second position toward said first position; and a valve seat disposed within the first fluid path and engageable by said piston when said piston is in said first position to prevent the first fluid flow from entering into the second fluid path;

wherein said valve seat is disposed within the cutout defined by the first body housing to fix said valve seat with respect to the first body housing and the separator plate.

16. The switch valve assembly as set forth in claim 15, wherein said valve seat comprises a seal ring defining a seal gland, and a seal disposed within said seal gland, with said seal engaged with said seal ring for restricting the first fluid flow from flowing between the separator plate and said seal ring into the second fluid path.

17. The switch valve assembly as set forth in claim 15, wherein said piston has a first portion having a first portion surface having a first portion diameter and a second piston portion disposed between said first portion and said valve seat and having a second portion surface having a second portion diameter greater than said first portion diameter, with said valve seat defining a valve seat hole, with said valve seat having an inner valve diameter across said valve seat hole less than said second portion diameter such that said piston engages said valve seat when in said first position.

* * * * *